July 28, 1931. R. O. HELGEBY 1,816,581
SPEEDOMETER TEMPERATURE COMPENSATOR
Filed Dec. 21, 1928

Inventor
Ralph Olaf Helgeby

By Blackmore, Spencer & Hush
Attorneys

Patented July 28, 1931

1,816,581

UNITED STATES PATENT OFFICE

RALPH OLAF HELGEBY, OF FLINT, MICHIGAN, ASSIGNOR TO A C SPARK PLUG COMPANY, OF FLINT, MICHIGAN, A COMPANY OF MICHIGAN

SPEEDOMETER TEMPERATURE COMPENSATOR

Application filed December 21, 1928. Serial No. 327,655.

This invention relates to measuring instruments and has been designed more particularly as an improvement in the temperature compensating provision for magnetic speedometers such as are used on motor vehicles. It is intended also that calibration shall be provided for by mounting the compensating member for movement relative to the parts for which it is associated.

An object of the invention is to provide a compensator having maximum efficiency in rendering the reading of the instrument accurate within a wide range of temperature changes.

Another object is to so mount the compensating member that it may be moved for the purpose of calibration.

Another object is to accomplish the above mentioned object with a structural element which is simple, inexpensive and easily applied.

Other objects and advantages will be apparent from the following description.

Figure 1:
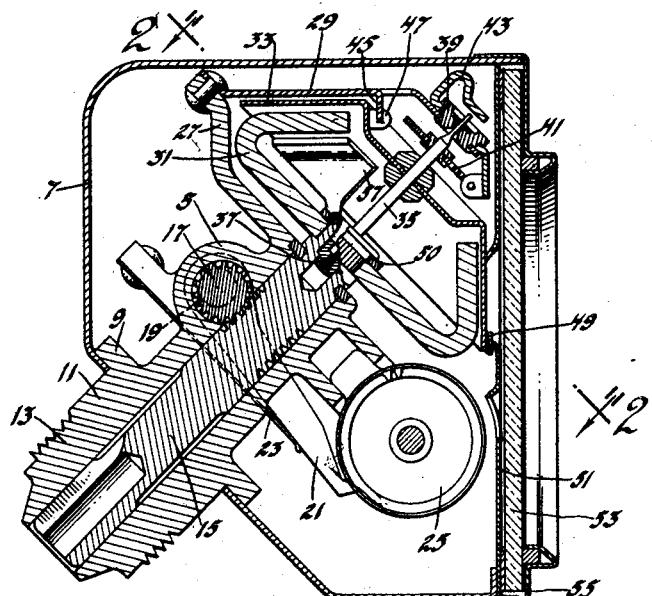
Figure 2:
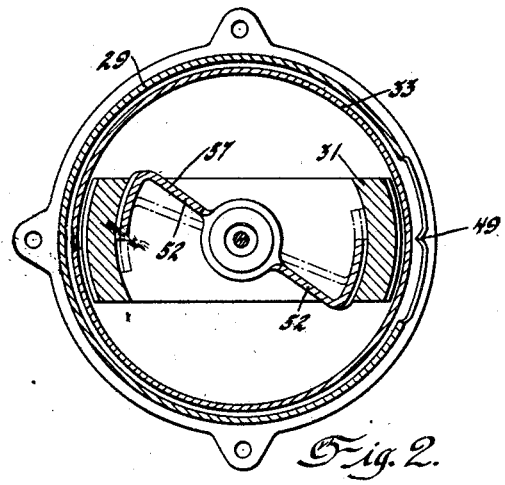

In the drawings Fig. 1 is a vertical section through a magnetic speedometer, my improved temperature compensator being incorporated therein. Fig. 2 is a transverse section substantially on line 2—2 of Fig. 1.

Referring by reference characters to the drawings, a frame 5 is housed within a casing 7. The frame is to carry the speedometer parts and the casing is seated against a flange 9 of the frame to which it may be secured in any conventional way, not shown. The frame has a stem part 11 externally threaded as at 13 for attachment to a nut associated with the coupling means for the flexible drive shaft. The frame is also internally bored to receive a worm shaft 15, the latter angularly related to the front face of the instrument. At its outer end worm shaft 15 is formed with openings to receive the usual connection means associated with the flexible drive shaft. These features are not a part of this invention and not fully illustrated.

The worm shaft 15 is geared to a second worm shaft 17, this being the so-called second worm shaft of the speedometer. At one end shaft 17 has an eccentric 19 serving to reciprocate a pawl 21, controlled by spring 23, the pawl operating through a suitable means to rotate the figure wheels of an odometer, one of the odometer wheels being designated by 25.

The frame at its top portion has diverging arms, one of which is shown at 27. To these arms are connected lugs extending from a conical field plate 29.

The end of shaft 15 is reduced, the reduced end passing through an opening in a bar magnet 31, the ends of which are upturned to lie in parallel relation with the adjoining wall of the conical field plate. Shaft 15 at its upper end may be externally serrated to engage the magnet and prevent its rotation relative to the shaft.

A similarly shaped conical speed cup or indicating member 33 is located between the field plate and the magnet, its conical wall being parallel with the conical wall of the field plate. This speed cup is mounted on a spindle 35 journalled in bearings carried by jewel cups 37 and 39 positioned in alignment and located one in the end of shaft 15 and the other in the apex of the conical field plate. A hair spring 41 is secured to the spindle 35 at one end and to a regulator 43 rotatably mounted about the upper bearing cup. An end of regulator 43 is bent over the extreme end of spindle 35 to limit the axial movement of the same.

Means such as struck up flanges 45 and 47 on the field plate and speed cup limit the rotation of the latter under the influence of the hair spring. The field plate is open at its front to render visible the indicating characters on the speed cup and is provided with a pointer 49 to aid in reading the instrument.

A cover plate 51, a glass 53 and a bezel 55 are used at the front of the instrument, these parts being conventional and not constituting a part of this invention.

The construction described is very efficient for the reason that due to the upturned ends of the magnet and the inclosed parallel walls of the speed cup and the field plate shaped to inclose the speed cup and magnet and shielding all the available magnetic flux for efficient influence on the speed cup, substantially all the magnetic energy is utilized. This is particularly true in the case of the conical walled speed cup and field plate with the magnet ends positioned in parallelism with said walls.

As is well known, the electrical conductivity of the speed cup decreases as the temperature rises with the result that the readings of the instrument tend to be too low at temperatures above that at which the instrument is calibrated and too high at lower temperatures. One known way of correcting for this error is to provide a shunt including a part, preferably an alloy, the magnetic permeability of which diminishes with increasing temperature.

In connection with the instrument as described I make use of a thermo-compensating unit 57 formed of a thermo-compensating alloy. This unit 57 has a central opening 50 seated over the reduced end of shaft 15 above the magnet. The serrations on shaft 15 do not extend into the annular part of the compensating member 57. After assembly of part 57 the extreme end of shaft 15 is turned over as shown in Fig. 1 to hold the compensating member in position. Compensating member 57 is formed with radial arms 52 terminating in cone-shaped portions in parallelism with the magnet and slightly spaced from the magnet, as shown in the drawings.

As a further and important advantage associated with this invention, it is possible to rotate the compensator after assembly as indicated in full and dotted lines on Fig. 2. This rotation may be conveniently carried out by means of a suitable tool. It will be understood that the compensating member is held from rotation by the end of the shaft but not so rigidly as to prevent its rotation as described above for the purpose of calibration. As a result an efficient means of calibration is afforded by a simple rotary movement of the compensating member.

It will be clear therefore that the relative positions of magnet, field plate, and speed cup constitute a very efficient instrument, one wherein the magnetic lines of force are used to best advantage. A shunt exists through the instrumentality of part 57 whereby varying temperature changes do not effect the accuracy of the reading of the instrument. With such a device calibration is easily obtained by rotation of the compensating member about the end of the worm shaft and relative to the magnet.

I claim:

1. In combination, a rotor shaft, a bar magnet carried thereby, said magnet having its ends bent up, a rotary speed cup, a fixed field cup, said speed cup and field cup having walls in parallelism with each other and with said magnet arms, a temperature compensating member secured to the extreme end of said rotor shaft within said magnet arms.

2. The invention defined by claim 1, said temperature compensating member formed with radially extending arms, the latter terminating in end portions in parallelism with the wall of the speed cup.

3. The invention set forth in claim 1, said compensating member being formed with radial arms terminating in end portions of arcuate shape in parallelism with the ends of the magnet and the speed cup, said compensating member mounted for circumferential adjustment relative to said magnet for the purpose of effecting calibration.

4. In combination, a rotor shaft, a bar magnet carried thereby, said magnet having its ends bent up, a rotary speed cup, a fixed field cup, said speed cup and field cup having walls in parallelism with each other and with said magnet arms, a temperature compensating member secured to said magnet between its arms, said compensating member being mounted for circumferential adjustment relative to said magnet for the purpose of effecting calibration.

In testimony whereof I affix my signature.

RALPH OLAF HELGEBY.